Jan. 25, 1938.    C. D. RYAN    2,106,191
MAIL TREATING MACHINE
Filed April 26, 1935    7 Sheets-Sheet 4

Fig. 4.

Inventor
Commodore D. Ryan

By Lyon & Lyon
Attorneys

Inventor
Commodore D. Ryan
By Lyon & Lyon
Attorneys

Inventor
Commodore D. Ryan

Patented Jan. 25, 1938

2,106,191

UNITED STATES PATENT OFFICE 2,106,191

MAIL TREATING MACHINE

Commodore D. Ryan, Los Angeles, Calif., assignor to National Postal Meter Company, Los Angeles, Calif., a corporation of California Application April 26, 1935, Serial No. 18,345

7 Claims. (Cl. 164—61)

This invention relates to mail treating machines and in particular one in which envelopes may be either sealed for mailing or opened to remove the contents therefrom.

One of the principal objects of this invention is to provide a machine which will operate automatically to feed and seal envelopes at a very rapid rate or which may just as rapidly and just as automatically operate to trim one edge of envelopes under treatment for the purpose of opening the same and to provide a safety control means for placing either the sealing means or the opening means into operation and which means will act automatically to prevent the sealing and opening means from both being operative at the same time.

A further object is to provide an envelope opening device which may be attached, in place of the usual postal meter, to the power plant of a postage printing machine. To provide a unitary attaching means which when actuated will not only lock the attachment in its operative position on the power plant but will simultaneously actuate the envelope feed conveyor clutch and the attachment clutch so that both of these clutches will be maintained in continuous driving relation with the power plant driving mechanism. The actuation of the attaching means will also function to elevate the rear end of the envelope feed conveyor truck whereby the diagonal positioning conveyor belt of the opener may function to correctly position the envelopes with relation to the cutter disc wheels of the opener.

A further object is to provide means for regulating the width of trim to be cut from the envelopes.

Other objects and advantages of the invention will become apparent as the nature of the same is more fully understood from the following description and accompanying drawings, wherein is set forth what is now considered to be a preferred embodiment. It should be understood, however, that this particular embodiment of the invention is chosen principally for the purpose of exemplification and that variations therefrom in details of construction or arrangement of the parts may accordingly be effected and yet remain within the spirit and scope of the invention as the same is set forth in the appended claims.

The "Power plant" disclosed in United States Letters Patent No. 1,988,036, issued January 15, 1935, to John Q. Finfrock; together with the "Envelope flap moistening device" disclosed in the Finfrock application Serial No. 735,578, filed July 17, 1934; constitutes a machine admirably adapted to the purposes of sealing envelopes, printing postage stamps upon mail matter, or for other printing jobs such, for example, as the printing of signatures upon checks. In other words, by actuating the moistening device to its inactive position and replacing the postage printing meter with an appropriate printing head, the characteristic signature of an authorized official may be automatically printed upon payroll, dividend or other checks issued in great numbers.

To extend the utility of the "power plant", I propose to provide a unit comparable to the postage meter which, like the meter, may be mounted upon the power plant and driven thereby for opening mail matter.

Thus, by the use of my attachment, the power plant may not only be used for sealing envelopes and printing postage stamps thereon but also may be effectively used for automatically opening envelopes and thereby greatly extending the utility of the machine.

A further accomplishment has been in providing an envelope opening device which requires but a few minor changes to be made in the power plant in order to enable this unit to be easily, quickly and operatively attached thereto.

The improved envelope flap moistening device has been incorporated in the power plant and, as these structures are fully illustrated and described in the Finfrock patent and application referred to, a full description thereof will not be repeated, however, the additions and changes necessary for the mounting of the envelope opening device will be described in detail.

*Power plant*

The power plant 20 is preferably organized into a compact unit, in which practically all of the driving mechanism 21 is enclosed.

Mounted upon the front left hand corner of the power plant (Figure 1) is a magazine 22 into which envelopes or other articles to be treated may be piled.

A feed conveyor 23 located across the front of the power plant is provided for removing envelopes or other articles, one at a time, from the magazine and conveying these articles past the envelope moistening device 24 and then presents the articles to the attachment for action thereon and finally operates to eject the articles from the machine. The attachment in this case, as shown in the drawings, includes an envelope opening device 25. It is believed that a description of the envelope opening device at this point will assist in a clearer understanding of the invention.

*Envelope opening device*

Figure 2:
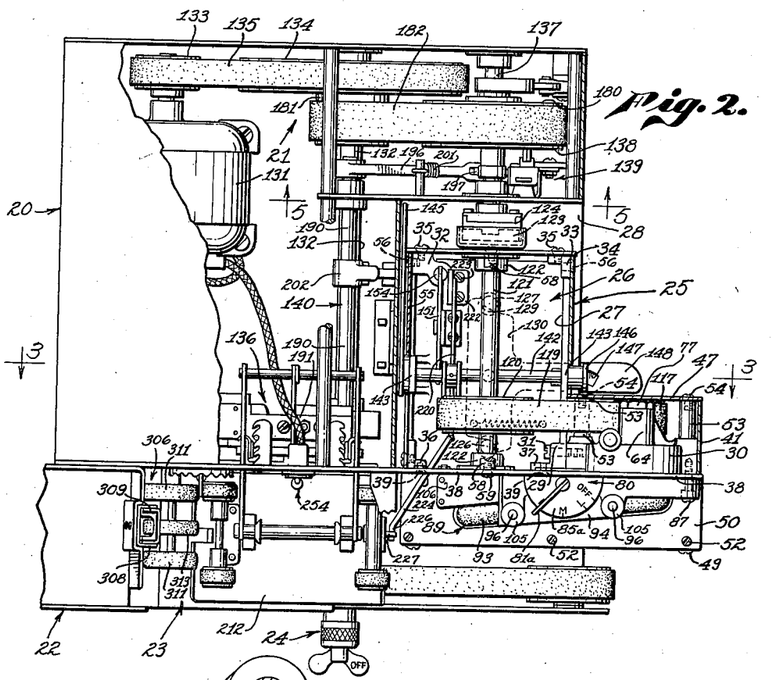
Figure 2 illustrates a plan view of Figure 1 partially in section to show the operating mechanisms.
Figure 3:
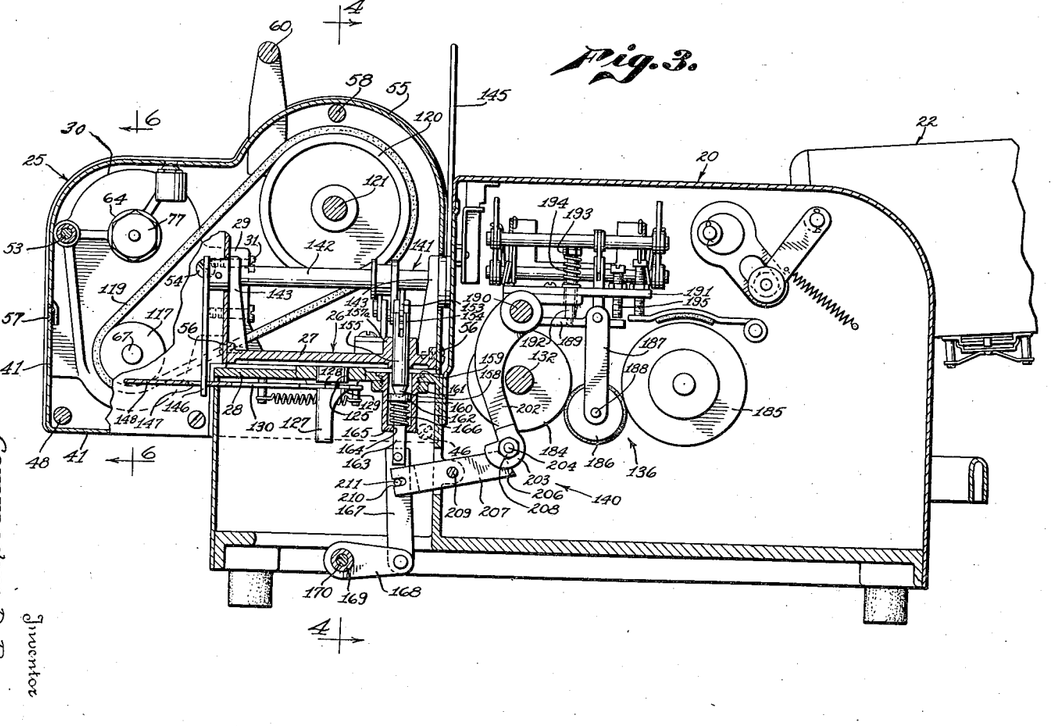
Figure 3 illustrates a sectional view taken substantially in the plane of line 3—3 of Figure 2.
Figure 4:
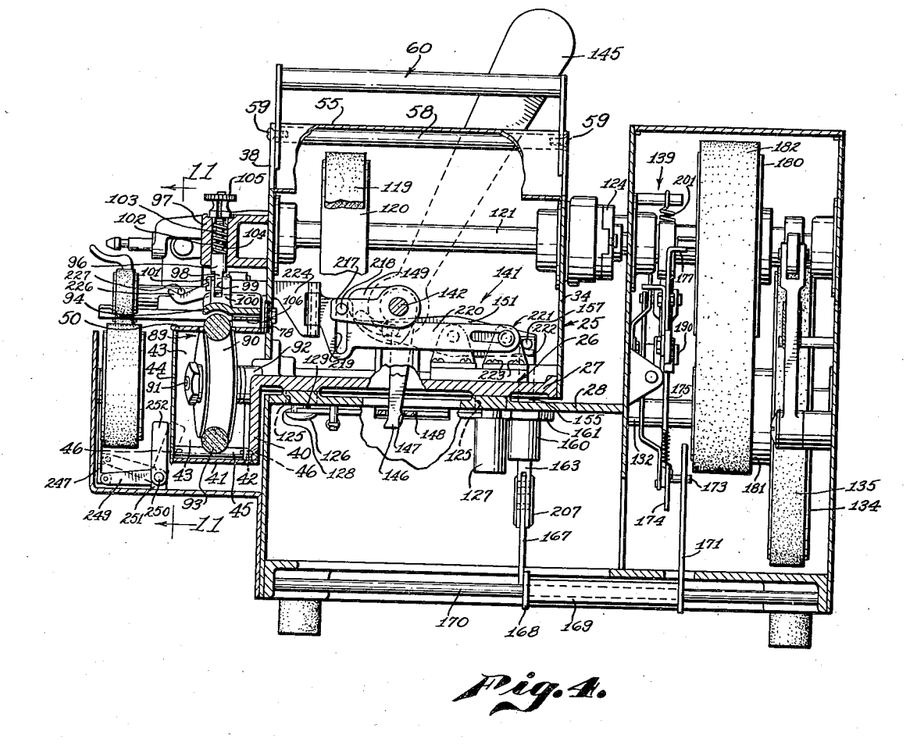
Figure 4 illustrates a sectional view taken substantially in the plane of line 4—4 of Figure 3.

The envelope opening device 25 is built upon and around a base casting 26 (Figures 2, 3 and 4). The base casting includes a more or less rectangular portion 27 adapted to be mounted upon the power plant attachment platform 28 (Figures 2, 3 and 4) in a manner to be described. The forward right hand corner (Figures 2 and 3) of the base casting is provided with a bracket 29 to which bracket the cutter discs' housing 30 is fastened as by means of screws 31. If preferred, however, this housing may be cast integral with the base. The rear end of the base casting is provided with two small angle brackets 32 and 33. A rear end wall 34 may be fastened to these brackets by screw means 35. Adjacent the left hand front corner the base casting is provided with an angle bracket 36 while adjacent the front right hand corner the base casting is provided with the bracket 37 which is cast as a part of bracket 29. The front end wall 38 is fastened to brackets 36 and 37 by screws 39.

As may be noted in Figure 2, the front face of the housing 30 is flush with the rear face of the front end wall 38 and is securely fastened thereto in a manner later to be described. This arrangement is advantageous in that the front wall will be braced at its far side by the housing 30.

Just ahead of brackets 36 and 37 the base casting is provided with a depending flange 40 (Figure 4). A bottom plate 41 is fastened along the bottom edge of flange 40 by means of screws 42. The bottom plate is bent upwardly at each end to form the bottom and side wall of the conveyor compartment 43. A plate 44 for closing the front side of the conveyor compartment may be fastened at one of its lower corners to flange 40 as by means of the spacer piece 45 and screws 46 (Figure 4) while its other corner may be fastened to the intermediate wall 47 as by means of spacer 48 and screws 49 (Figure 6). The top surface of the conveyor compartment is closed by a deck plate 50 which is fastened in place by a number of brackets 51 and screws 52. The intermediate wall 47 is braced from the cutter discs' housing 30 by means of spacers 53 and screws 54 (Figure 2). As the intermediate wall 47 is spaced rearwardly of the front wall 38 and extends from adjacent one side of the base casting out slightly beyond housing 30, the bottom plate 41 is made sufficiently wide to form a bottom and partial side closure for the space between the front plate 44 of the conveyor compartment 43 and the intermediate wall 47 (Figures 3–6). A cover plate 55 formed to the contour of the front and rear walls and the front and intermediate walls so as to nicely enclose the interior of the opener may be fastened along each side of the base casting as by means of screws 56 while the end of the narrow portion which follows the contour of the front and intermediate walls may be fastened to the upturned end of the bottom plate 41 by screw 57 (Figure 3). The upper ends of the front and rear walls may be connected by a brace member 58 which is fastened to each plate by screws 59.

A handle 60 may be provided for convenience in placing or removing the opener from the power plant.

The opener is provided with two cooperating cutter disc wheels 61 and 62 which are operative for trimming a narrow strip from the edge of the envelopes conveyed therepast and in this way opening the envelopes to permit the contents to be removed therefrom.

The cutter disc wheels are mounted in the housing 30 and for this purpose the housing is provided with a pair of spaced bearings 63 and 64. Only one of the cutter wheels is power driven, which in this case is the lower wheel 61.

The power driven wheel 61 (Figure 6) is mounted upon a more or less cup shaped hub 65 by means of the flanged nut 66, which nut is screw threaded upon shaft 67 and through the diagonal conveyor pulley 68 forces the cutter disc 61 securely against the annular flange 69 of hub 65.

The flanged nut 66 may also act through its clamping effect upon the cutter disc 61 to securely clamp hub 65 against the shoulder 70 of shaft 67.

As may be observed in Figure 6, hub 65 is provided with a cylindrical portion 71 projecting from the annular flange 69 and cooperating with a similar cylindrical portion 72 formed on the housing 30 to prevent the envelope trimmings from working into the space formed between housing 30 and hub 65. The shaft 67 is rotatably mounted in bearing 63.

The rear face of cutter disc 61 is substantially perpendicular to the axis of its rotation and is beveled from its front face sufficiently to provide a relatively sharp peripheral edge.

The upper cutter disc 62 is provided with a substantially flat front face which is adapted at its lower edge to engage the upper edge of the rear face of the lower cutter disc 61 and to thus form a rotary shear, and to be driven thereby.

The upper cutter disc 62 may be fastened upon one end of shaft 73, which shaft is rotatably and slidably mounted in the housing bearing 64. Means are provided for yieldingly urging shaft 73 together with its cutter disc 62 forwardly so as to maintain the upper cutter disc in shearing relation with the lower cutter disc. These means may include a compression spring 74 mounted within a counterbored portion of shaft 73 so as to, at one end, act against the shaft while its opposite end acts against the housing through a spring follower 75, center 76, which is mounted in plug 77, in turn screw threaded into the end of the housing bearing 64.

The power plant is provided with means for sealing envelopes, which means is indicated at 24. When the letter opening attachment 25 is placed upon the power plant, the machine may still be used for sealing envelopes. However, as it will be well appreciated, the envelope opening means must be rendered inoperative during the sealing operation or otherwise the newly sealed envelopes will be cut open by the cutters; and for this purpose a guard plate 78 is provided. The guard plate may be made of relatively light material in order that it may be flexed by suitable control means to guide the envelopes clear of the cutter discs 61 and 62. The guard plate may be fastened to the front wall 38 of the attachment by suitable screw means 79 illustrated most clearly in Figures 12 and 15. The free end of the guard plate extends adjacent to the peripheries of the cutting disc wheels 61 and 62 and this end of the plate is provided with an adjusting means 80 (Figures 1, 2, 12, 14, 15 and 16). The adjusting means may include a vertical shaft 81 journaled in casing 85 and having at its lower end an eccentric pin 82 arranged to engage an appropriate slot 83 formed in the upper flanged portion 84 of the guard plate. While the upper end of the vertical shaft may be provided with an actuating handle 81a and the casing with an index plate 85a provided with appropriate indicating symbols, such as "Off" to indicate when the plate has been positioned so as to guide envelopes clear of the cutting means; with L which indicates that the plate is located in position to guide the envelopes to the cutting means to take a light cut therefrom; M for a medium cut; and H for a heavy cut.

Figures 14, 15, 16:
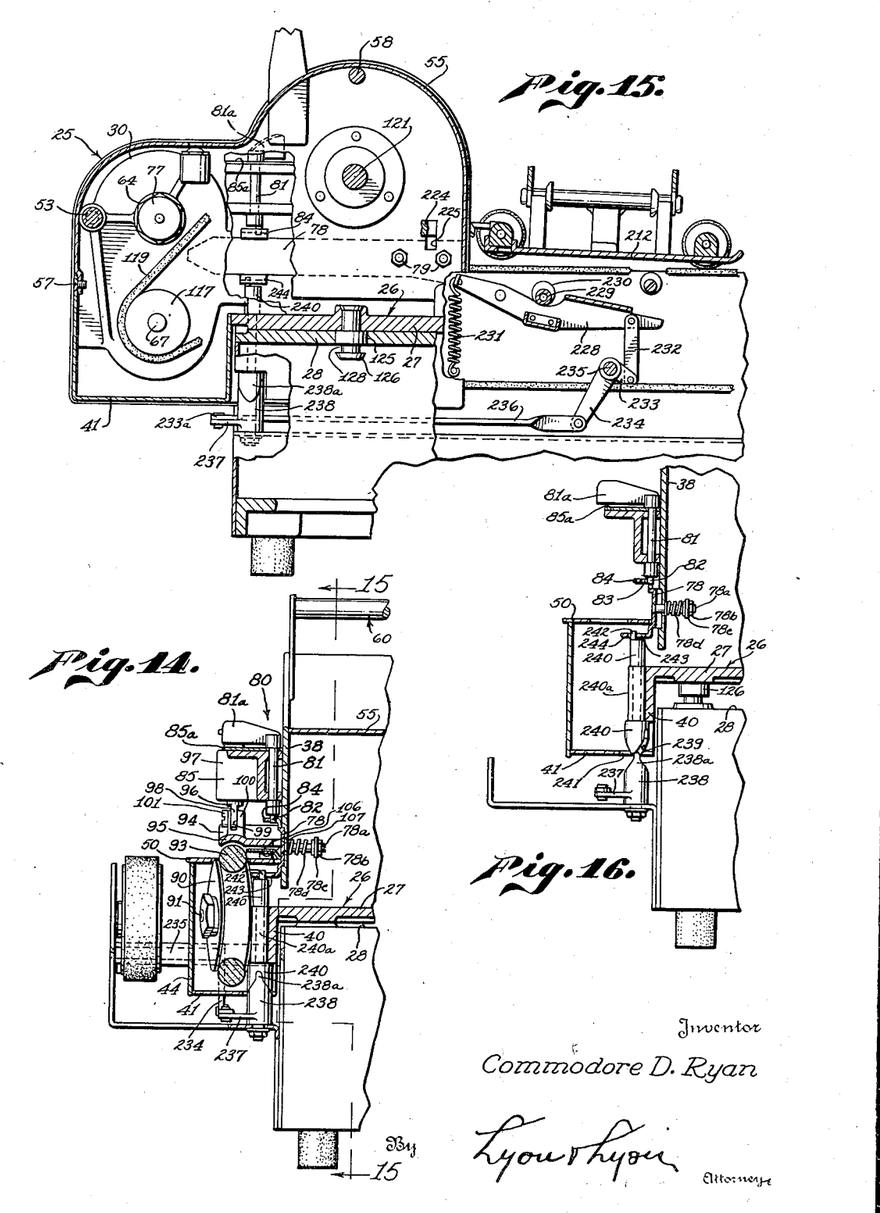
Figure 14 illustrates, on enlarged scale, a fragmental sectional view taken substantially in the plane of line 14—14 of Figure 1 to show a different control.
Figure 15 illustrates a fragmental sectional view taken substantially in the plane of line 15—15 of Fig. 14.
Figure 16 is a view similar to Fig. 14 and illustrates how the coupling for the sealer and cutter control means will become connected during the placing of the attachment upon the power plant.

As previously stated, the guard plate 78 is of thin material and sufficiently flexible to be easily swung from its full "Off" to its maximum cutting position. In order to at all times maintain the flanged portion 84 in engagement with eccentric pin 82 of the adjusting means, any form of suitable spring means may be provided. One form of such means is illustrated in Figure 14 and may include a pin 78a fastened to the plate and extending rearwardly therefrom through the front wall 38 of the attachment housing. The end of this pin is threaded to receive a nut 78b and washer 78c. Acting between the inner face of wall 38 and washer 78c is a compression spring 78d which acts to yieldingly urge the guard plate 78 into its retracted position as illustrated in this figure, in which position it will guide the envelopes into the cutting means to take therefrom a maximum cut.

The lower cutter disc 61 is for the most part inclosed within the conveyor compartment and for the purpose of inclosing the upper cutter disc 62 a casing 85 is mounted upon the front end wall 38 and is of such shape as to nicely cover the cutter disc above the shearing portion of the discs. A space 86 (Figure 6) is left between the lower edge of casing 85 and the conveyor compartment deck plate 50 to enable envelopes to be fed along the guide surface to the discs. The right hand end of casing 85 is securely mounted upon the front wall as by screw means 87, which screw passes freely through the wall and is screw threaded into the cutter disc housing 30 and in this way securely clamps the front wall between the casing and housing. The other end of casing 85 may be fastened directly to the front wall by screw means 88.

A diagonal conveyor means 89 is provided to insure that each envelope under treatment will be moved into correct register with the guiding surface of guard plate 79. The diagonal conveyor means may include two spaced pulleys.

The diagonal conveyor pulley 68 is, as has been previously pointed out, mounted upon hub 65 between cutter disc 61 and the flanged nut 66. The second diagonal conveyor pulley 90 is spaced from pulley 68 and is angularly positioned with relation thereto (Figures 2 and 4). The second conveyor pulley 90 may be freely journaled upon the stub shaft 91, which shaft is suitably fastened to the angle bracket 92 cast integral with the base casting 26.

An endless round belt 93 travels around the two pulleys. The upper run of belt 93 lies for the most part above deck plate 50 and as may be noted from Figure 2, is angularly related to the guiding surface of the front end wall 38. By this arrangement of the diagonal conveyor belt, each envelope presented to it by the feed conveyor of the power plant will be moved sideways until its adjacent edge will be moved into parallel engagement with the guiding surface, to thereby insure trimming a strip of uniform width from the full length of each envelope under treatment. The diagonal or second conveyor as it may be called, also assists in positively propelling the envelopes past the cutting discs.

A shoe 94 may be mounted directly above the diagonal conveyor so as to provide a backing for the upper surface of the round belt 93. To render shoe 94 more effective in its cooperative relation with the belt it may be provided with a concaved surface 95 extending the full length of the shoe. It will be understood that the shoe does not engage the belt but acts as a support against which the envelopes will be pressed by the conveyor belt 93 as they are conveyed through the machine.

The shoe 94 is preferably mounted upon casing 85 by a pair of spaced spindles 96 (Figures 1 and 4) which spindles are slidably mounted in appropriate bosses 97 preferably cast integral with the casing. Each spindle is pivotally mounted to one end of the shoe, and for this purpose each spindle is provided with a tongue 98 fitting freely into the slots 99 formed in the shoe lugs 100, and each spindle is pivotally fastened to the shoe by the pivot screws 101. The shoe 94 is yieldably mounted to accommodate envelopes of different thicknesses, and for this purpose the spindles are reduced in diameter for a portion of their length to form shanks 102 to receive springs 103, while the upper ends of the spindle bores 104 are also reduced in diameter to slidably pass the spindle shanks and to form shoulders against which the other ends of springs 103 may engage. The upper ends of the spindle shanks are threaded to receive adjusting nuts 105, which nuts engage the upper surfaces of bosses 97 to independently position the ends of the shoe with relation to the round conveyor belt. By this arrangement the ends of the shoe may lift independently as envelopes of different thicknesses pass through the machine, and the shoe will yieldingly resist this lifting action due to springs 103.

Figures 12, 13:
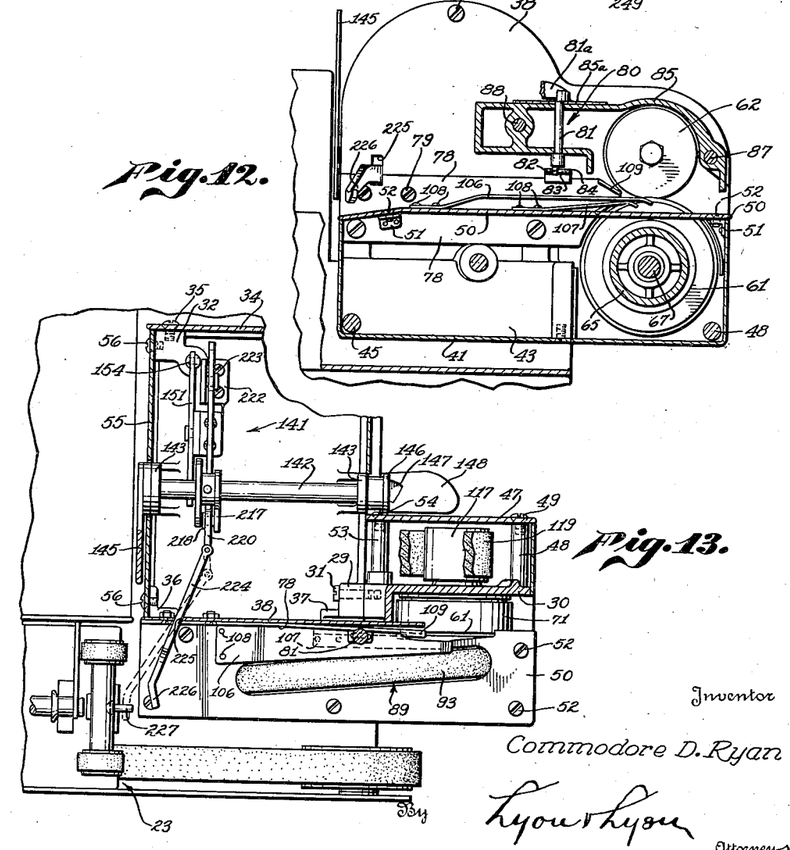
Figure 12 illustrates a fragmental sectional view taken substantially in the plane of line 12—12 of Figure 6.
Figure 13 illustrates a fragmental sectional view taken substantially in the plane of line 13—13 of Figure 1.

Means are provided for directing the envelopes between the cutter discs, which means may include the two superimposed leaf springs 106 and 107 (Figure 12). Both of these springs are positioned between the front face of the front end wall 38 and the adjacent side of the diagonal conveyor belt 93. The springs may be fastened to the deck plate 50 as by means of rivets 108.

Guide spring 106 may be formed to rise more or less gradually from the plane of the deck plate and to extend practically parallel to the deck at a height corresponding to the shearing point formed at the intersecting point of the cutter discs. The lower spring 107 may be likewise formed and arranged to reinforce the free end of guide spring 106 as is clearly shown in Figure 12.

As a further guide for the envelopes, the end of the guide plate 78 adjacent the cutting discs may be flanged as at 109 (Figure 12).

The lower cutter disc 61 is power driven from the power plant driving mechanism. For this purpose the lower cutter disc shaft 67 is provided with a small pulley 117 which is fastened to the shaft by a set screw 118. By means of belt 119 the small pulley is driven from the relatively large pulley 120 fastened upon drive shaft 121. The drive shaft is journaled in suitable bearings 122 carried by the end walls 34 and 38, and at its extreme rear end is fastened a grooved coupling member 123 which cooperates with the tongued coupling member 124 of the attachment shaft of the power plant to provide a driving connection to the power plant driving mechanism. The coupling members 123 and 124 are readily connected and disconnected as the envelope opening device is mounted upon or removed from the power plant attachment platform. To correctly position the opener upon the platform and to thereby insure a correct alignment of the coupling members, the platform is provided with two spaced locating holes 125, while the base casting of the opener is provided with two depending cylindrical lugs 126 and 127 which are adapted to project into the locating holes as the opener is lowered into position. The rear lug 127 is made sufficiently long so as to act as a leg for supporting the rear end of the opener when it is removed from the power plant.

Means are provided for locking the opener onto the power plant, which means may include providing each of the lugs 126 and 127 with an annular groove 128 into which the hooked ends 129 of the locking lever 130 are adapted to be swung, note Figures 2 and 3.

Power plant driving mechanism

The power plant driving mechanism is the same as disclosed in the stated Finfrock patent and application and includes briefly an electric motor 131 arranged to drive the line shaft 132 by means of pulleys 133, 134, and belt 135. The feed conveyor 23 is normally connected to the line shaft by a conveyor clutch 136, while the attachment driving shaft 137 is operatively connectable with the line shaft by means of an attachment clutch 138. The attachment clutch 138 is normally maintained disengaged and is provided with a tripping mechanism 139 operable for placing the clutch in driving engagement. The tripping mechanism is arranged to automatically disengage the clutch after it has completed a single revolution.

The conveyor clutch 136 is normally maintained in driving engagement with the driving mechanism and will be, through the operation of a conveyor clutch control means 140, automatically disconnected for substantially the entire operating cycle of the attachment clutch. In other words, the conveyor and attachment clutches operate alternately. This mode of operation must be changed to operate the opening device to which envelopes should be continuously fed while the cutter discs are being continuously driven.

A setting means 141 is provided for retaining the conveyor and attachment clutch controlling means actuated and thereby for maintaining the conveyor and attachment clutches in constant driving engagement during the operation of the opener. A separate setting may be provided for independently setting the conveyor and attachment clutch control means and for locking the opener in its operative position in the powerplant. It is preferable, however, to provide a single setting means which, with a single, simple operation, will lock the opener securely in its correct operative positon on the power-plant and which setting means will simultaneously set the two control means to insure the proper driving condition for the envelope feed conveyor and the cutter discs of the opener.

Setting means

The actuating portion of the setting means is preferably mounted in the opener and may include the transverse shaft 142 journaled in standards 143, which standards are carried by the opener base casting 26.

As may be noted in Figure 3, the transverse shaft extends through both sides of the attachment cover 55, and has suitably fastened upon its right hand end a setting handle 145 and upon its left hand end a locking finger 146. The free end of the locking finger is formed and adapted to play into the cam shaped opening 147 (Figure 2) formed in the handle 148 of the attachment locking lever 130.

In Figure 4 these parts are shown in the positions they would occupy after the setting handle had been actuated to set the opener for operation. In this figure it will be noted that the locking finger has engaged the cam slot formed in handle 148 and through its movement during the actuation of the setting handle has swung the locking lever 130 into locking engagement with the annular grooves 128 formed in the opener lugs 126 and 127, and thereby locking the opener to the attachment platform of the power plant. By this arrangement, unless the opener has been correctly positioned upon the attachment platform, the locking means can not be actuated to lock the opener in place.

The setting means also actuates to maintain the attachment clutch tripping means in its clutch releasing position, whereby the attachment clutch will be maintained in constant driving engagement with power plant driving mechanism, and in this way the cutter discs will be likewise constantly driven.

The actuation of the setting means also acts to swing the conveyor clutch control means sufficiently to maintain this control means free from engagement with its attachment shaft actuating means, and thereby maintaining the conveyor clutch in constant driving engagement for continuously driving the envelope feed conveyor.

As far as the envelope opening device is concerned, the same means is employed for actuating both the attachment clutch tripping means and the conveyor clutch control means, and includes providing the transverse shaft 142 with cam disc 149 (Figure 10), in which there is cut an eccentric cam slot 150.

Figure 10:
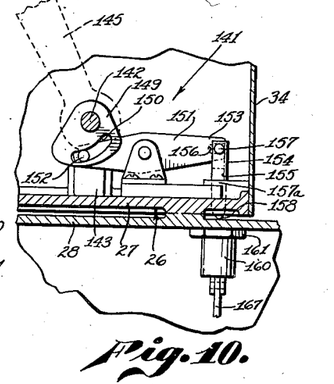
Figure 10, Sheet 5, illustrates a fragmental sectional view of the means for actuating the conveyor and attachment clutches by the attachment control lever.

A double ended lever 151 is provided with a cam pin 152, which pin rides in the cam slot 150.

As stated, the cam slot is eccentric to the rotative center of the transverse shaft and, therefore, as the setting means is swung from its released to its setting position, the cam pin end of the double-ended lever will be elevated while its opposite end 153 will be depressed. The end 153 of the double lever fits between the bifurcated end 154 of the plunger 155 and is slotted, as at 156, to form a pivotal and sliding connection with the plunger pivot pin 157. The plunger 155 is slidably journaled in the base casting bearing boss 157a and when the setting means is in its retracted position the rounded nose 158 of the plunger is retracted sufficiently to become substantially flush with the under surface of the base casting 26, but when actuated to its setting position the plunger is thrust downwardly from the base casting to its extended position, as illustrated in Figure 3. This motion of plunger 155 is made use of to actuate the power plant setting means for maintaining the conveyor and attachment clutches active.

*Power plant setting means*

The power plant disclosed in the stated Finfrock patent and application does not include the setting means and, therefore, this means must be added thereto. For this purpose the attachment platform 28 may be bored, as at 159, to receive the flanged cylinder 160. A lock nut 161 may be provided for securely locking the cylinder to the platform. It will be understood that the cylinder is positioned to be in substantial alignment with plunger 155 when the opener is mounted upon the power plant. Slidably mounted in the cylinder is a piston 162 having a piston rod 163, which slidably passes through the bore 164 formed in the otherwise closed end 165 of the cylinder. The piston is yieldingly maintained in the upper end of the cylinder by a spring means 166, which surrounds the piston rod and acts between the lower side of the piston and the inner face of the closed end of the cylinder. The upper face of the piston may have a depression formed therein to receive the rounded nose 158 of plunger 155. By this arrangement, as the plunger is thrust downwardly during the setting operation, piston 162 will be engaged and correspondingly depressed.

The downward movement of the piston operates the power plant setting means to actuate the attachment clutch tripping means to maintain its clutch continuously active. It also acts to disconnect the conveyor clutch control mechanism from the attachment drive means and to maintain the conveyor clutch continuously active. The setting means for actuating the attachment clutch tripping means will be described first.

This means may include a connecting rod 167 pivotally connected at one end to the free end of piston rod 163 and at its opposite end to the free end of crank arm 168. The other end of the crank arm is fastened to one end of sleeve 169, which sleeve is journaled upon the cross shaft 170.

Fastened to the other end of the sleeve is an upstanding finger 171. The free end 172 of the finger (Figure 5) is positioned to engage the horizontally projecting pin 173 of the latch member 174 when it is swung in a counter-clockwise direction, as viewed in Figure 5. As the latch member is pivotally connected to the lower end of the attachment clutch tripping lever 175, the motion imparted to the latch member during the swing of finger 171 will in turn cause the tripping lever to be swung about its pivot 176 sufficiently to rock its upper end 177 clear of the free end of the attachment clutch lever 178, thus releasing the attachment clutch member 179 to complete a driving connection between the attachment driving shaft 137 and the attachment clutch pulley 180. The attachment clutch pulley 180 may be driven from line shaft 132 by the small line shaft pulley 181 and belt means 182.

Through the mechanism just described, the actuation of the letter opener setting means will cause the plunger 155 to be thrust downwardly to in turn depress the power plant piston 162. The depression of the power plant piston will thrust downwardly its associated piston rod 163 and through the connecting rod 167 the free end of crank arm 168 will be rotated in a clockwise direction, as viewed in Figure 3.

Figure 5:
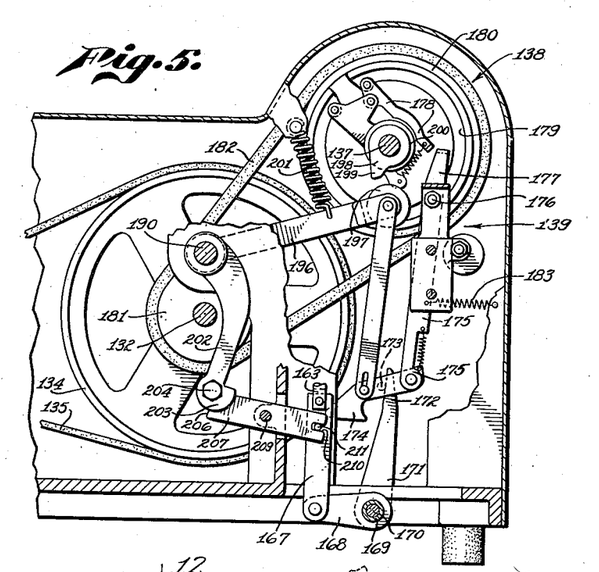
Figure 5 illustrates a sectional view taken substantially in the plane of line 5—5 of Figure 2.
Figure 6:
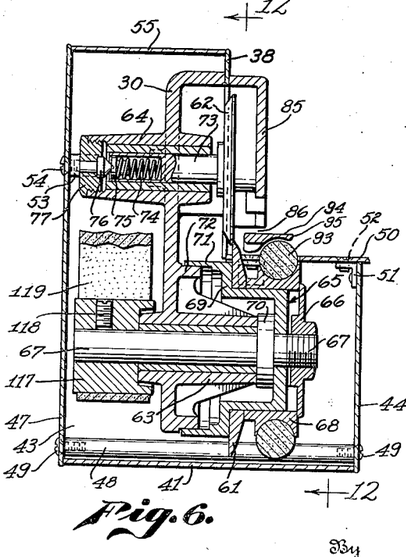
Figure 6 illustrates a sectional view taken substantially in the plane of line 6—6 of Figure 3.

Referring to Figure 5, which is a view taken in the opposite direction to that of Figure 3, the crank arm 168 will be rotated in a counter-clockwise direction as the piston 162 is depressed during the setting operation. The motion of crank arm 168 will be transmitted through sleeve 169 to the upstanding finger 171, thus causing the upper end 172 of this finger to be likewise swung in a counter-clockwise direction.

The motion imparted to the free end 172 of the upstanding finger, may be utilized for swinging the tripping lever 175 free from the clutch lever 178 of the attachment clutch through its engagement with the projecting pin 173 of the tripping lever latch member 174.

Due to this arrangement, as long as the power plant piston 162 is maintained depressed, the attachment clutch tripping mechanism will be maintained in its clutch releasing position whereby the attachment clutch 138 may operate to continuously drive the letter opening device.

The attachment clutch tripping mechanism will be returned to its normal inoperative position as soon as the letter opener setting handle 145 is swung to its releasing position, and thereby withdrawing plunger 155 from engagement with the power plant piston 162 which piston will return to its initial inactive position under the influence of spring 166. The return of piston 162 to its initial inactive position will also return the other parts of this mechanism to their initial inactive positions. The tripping lever 175 will be returned to its clutch disengaging position under the influence of its spring means 183.

Before describing the setting means which are operable for maintaining the conveyor clutch in continuous driving operation, the conveyor clutch and its controlling mechanism will be briefly described.

The conveyor clutch 136 includes a driving clutch wheel 184 fastened on the forward end of line shaft 132; spaced a short distance to the side of this wheel is a driven clutch wheel 185.

As may be observed in Figure 3, a rubber-tired clutch wheel 186 is normally maintained in driving engagement with the peripheries of the two clutch wheels 184—185. The clutch wheel 186 is swingably supported between a pair of spaced links 187 which carry at their lower ends the clutch wheel axle 188 and at their upper ends are pivotally connected to the clutch lever 189.

Control means are provided for either maintaining the rubber tired clutch wheel 186 in driving engagement with the peripheries of the other clutch wheels, or disengaged from the wheels so as to disconnect the driving mechanism of the power plant from the conveyor.

The conveyor clutch control means 149 may include a control shaft 190. The clutch lever 189 may be journaled at the forward end of the control shaft and may be yieldingly actuated in response to a turning moment of this shaft through a superimposed crank arm 191 fastened to this shaft to which the clutch lever may be yieldingly connected by means of rod 192, which rod at its lower end may be suitably fastened to the clutch lever and intermediate of its ends may pass freely through a suitable bore provided in the crank arm.

The upper end of rod 192 may be provided with a pair of adjusting lock nuts 193. Surrounding the rod 192 and yieldingly acting between the crank arm and the lock nuts may be mounted a spring means 194. A set screw 195 may be screw threaded through crank arm 191 and locked in its adjusted position by a suitable lock nut for maintaining the crank arm and clutch lever spaced a predetermined distance apart when the crank arm 191 swings to release the clutch. It will be understood that set screw 195 is not fastened to lever 189.

By this construction, when shaft 190 is rotated in a clockwise direction, as viewed in Figure 3, the crank arm 191 will be swung downwardly until the end of the set screw 195 will engage the clutch lever 189. A further rotation of this shaft will cause the clutch lever to be likewise swung downwardly and through links 187, will lower the rubber-tired clutch wheel free from the peripheries of the two clutch wheels, and in this way will bring about a disengagement of the conveyor clutch.

A rotation of shaft 190 in a counterclockwise direction, as viewed in this figure, will act to elevate the rubber-tired clutch wheel into driving engagement with the two clutch wheels.

Any additional motion of shaft 190 will be compensated for by means of spring 194, thus by means of shaft 190 the conveyor clutch may be brought into or out of driving engagement.

In the normal operation of the power plant, the conveyor clutch is under control of the attachment driving shaft, for the reason that it is desirable to maintain the conveyor clutch in driving engagement whenever the attachment clutch is inactive, and to automatically disconnect the conveyor clutch during each cycle of operation of the attachment clutch, and for this purpose the forward end of the control shaft 190 is provided with cam lever 196. The free end of the cam lever may be bifurcated to operatively support between the bifurcations thereof a cam follower wheel 197, which wheel is adapted to follow the irregular contour of the conveyor clutch control cam 198, which cam is suitably fastened to the attachment driving shaft 137.

In Figure 5, the conveyor clutch control cam 198 is illustrated in the position it normally assumes while the attachment clutch is maintained disengaged. In this position it will be noted, that the projection 199 of the cam is opposite the adjacent periphery of cam wheel 197.

A clockwise rotation of the control shaft 190, as viewed in Figure 5, will correspond to a counterclockwise rotation of this shaft as viewed in Figure 3, as these figures are taken in opposite directions and therefore during such time as the cam follower wheel 197 engages the projection 199 of the control cam, the conveyor rubber-tired clutch wheel 186 will be lifted into driving engagement with the periphery of the two clutch wheels.

During the initial rotation of the attachment clutch, the cam follower wheel 197 will ride off of projection 199 onto the concentric portion 200 of the control cam, thus permitting the cam lever 196 to be lifted upwardly in a counter-clockwise direction as viewed in Figure 5 under the influence of its spring means 201.

A counter-clockwise rotation of the cam lever 196 in Figure 5 will cause a clockwise rotation of the control shaft as viewed in Figure 3, and this clockwise rotation of shaft 190, as previously described, will lower the clutch wheel 186 free of the two clutch wheels 184, 185, to bring about a disengagement of the conveyor clutch. It may be observed in Figure 5 that the concentric portion 200 extends for nearly the entire periphery of the control cam 198, and therefore during the rotating cycle of the attachment clutch, the conveyor clutch will be maintained disengaged, but as soon as the attachment clutch completes its rotation, the conveyor clutch through the means described will again be brought into driving engagement with the power plant driving mechanism.

When the power plant is to be used for driving the letter opening attachment, it is desirable to lower the cam follower wheel 197 free from engagement with projection 199 of the control cam 198 and in this way to maintain the conveyor clutch in continuous driving engagement and to eliminate any noise which might be caused by the projection striking the cam follower wheel during each revolution of the attachment clutch shaft.

The actuation of the power plant setting means may be made use of for swinging the control shaft 190 in a counter-clockwise direction as viewed in Figure 3, which rotation of the shaft will be permitted due to the spring connection between the crank arm 191 of the control shaft and the clutch lever 189, and in this way the conveyor clutch will be maintained in driving engagement with the power plant driving mechanism, and due to this additional motion of the control shaft, the cam lever 196 will be lowered as illustrated in Figure 5, whereby the control cam 198 may rotate freely without striking the cam follower wheel 197 during each revolution of the attachment clutch.

Figure 7:
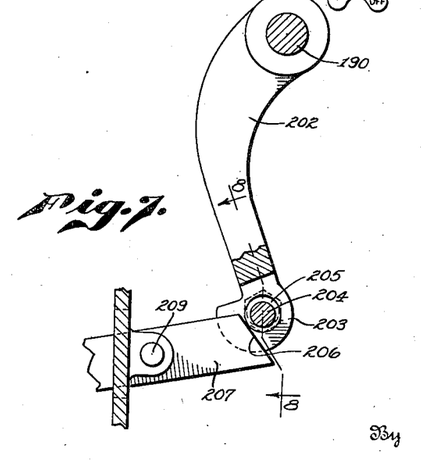
Figure 7, Sheet 2, illustrates an enlarged fragmental view, partially in section, of the conveyor clutch control means.
Figure 8:
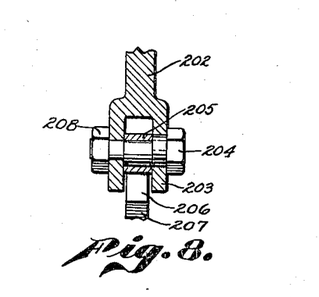
Figure 8 illustrates a fragmental sectional view taken substantially in the plane of line 8—8 of Figure 7.

The control shaft 190 may be actuated from the power plant setting means by fastening to this shaft intermediate its ends, as may be noted in Figure 2, a setting lever 202, having its free end extending downwardly and bifurcated as at 203, as may be more clearly seen in Figures 7 and 8. Projecting transversely across the bifurcated portion of the setting lever 202 may be mounted a bolt 204. The body portion of the bolt between the bifurcations of the lever may be eccentric to the center line of the bolt, and may have mounted thereon a roller 205, against which may travel the cam end 206 of the rocking lever 207. Due to the eccentric mounting of the roller 205 with relation to the center of the bolt, its position may be adjusted with relation to the cam surface 206 and clamped in its adjusted position by means of a suitable nut 208. The rocking lever 207 may be pivotally mounted to the power plant base casting by an appropriate pivot pin 209.

The end of the rocking lever 207 opposite to its cam end 206 is bifurcated to straddle the connecting rod 167 and the bifurcated ends of the link are slotted as at 210 to receive the driving pin 211 which operatively connects the rocking lever to the connecting rod.

By this construction, the rocking lever 207 will be rocked by the setting means and as a result thereof the cam end 206 of the lever will engage the roller 205 and thereby actuate the lever to maintain the conveyor clutch in driving engagement with the power plant driving mechanism and to remove the cam follower wheel 197 from its control cam 198.

From the above description it will be appreciated that three important functions are simultaneously performed during the operation of the letter opener setting handle 145. These functions are, viz: the locking of the opener securely in its operative position on the power plant, the actuation of the attachment clutch tripping mechanism to maintain the attachment clutch in constant engagement with the power plant driving mechanism and to actuate the conveyor control mechanism to maintain the conveyor clutch in constant driving engagement with power plant driving mechanism and at the same time releasing the control of the conveyor clutch from the control cam of the attachment drive shaft.

Figures 1, 9:
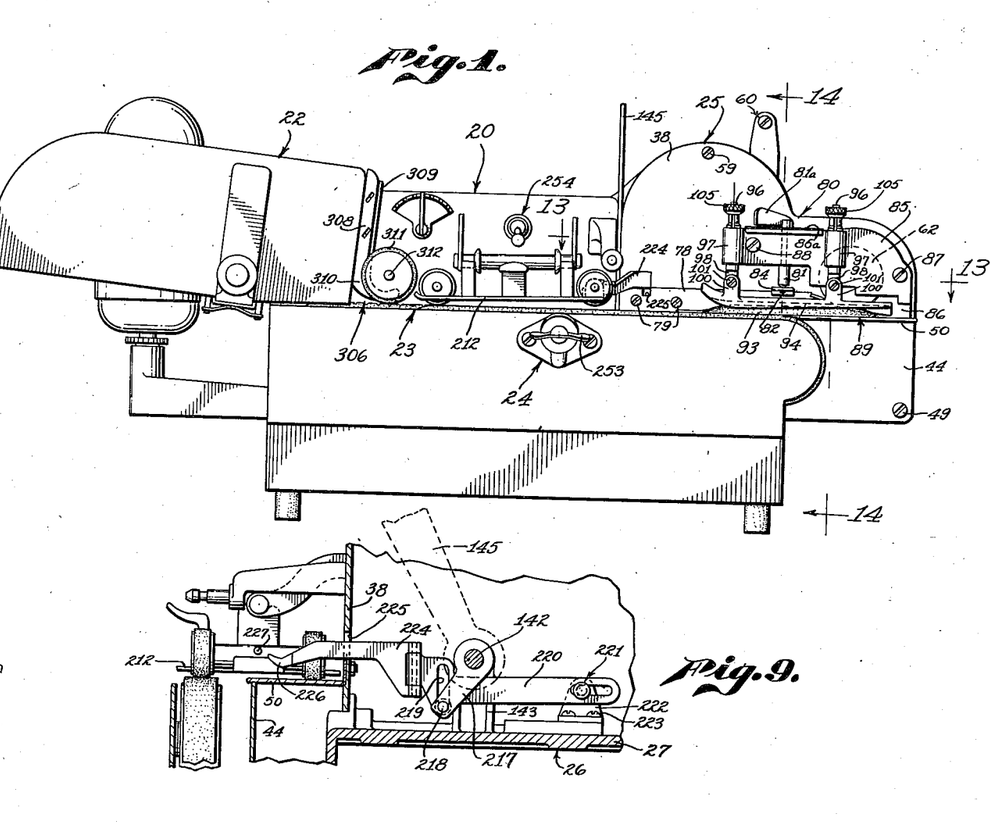
Figure 1 illustrates a front elevational view of the letter opener attached to the power plant of a postage printing machine.
Figure 9, Sheet 1, illustrates an enlarged fragmental sectional view of the conveyor truck lifting means.

As may be observed in Figures 1 and 2, the feed conveyor 23 is provided with a cooperating truck 212. The truck acts to weight the envelopes under treatment down onto the top surface of the conveyor, thereby insuring a more even and positive feed of the envelopes through the machine.

When the letter opening device is mounted on the power plant and set for operation, it is important that the rear end of truck 212 is lifted clear of the feed conveyor in order that the diagonal belt 93 may act to shift the envelopes under treatment into directing engagement with the guiding surface of the opener. Separate means may be provided for lifting and maintaining the end of the truck in its elevated position during the operation of the opener; however, in the preferred embodiment of the invention, the means for lifting and maintaining the truck elevated are preferably operated by the setting means as may be noted in Figures 2, 4 and 9. In these figures the transverse shaft 142 is provided with a crank arm 217 having located at its free end a crank pin 218, adapted to travel in the cam slot 219 formed in the lifter lever 220.

The lifter lever 220 is pivotally and slidably supported at its rear end by means of a pin and slot connection 221 to a suitable bracket 222, which bracket is suitably fastened to the opener base casting 26 as by means of screws 223. Hinged to the forward end of the lifter lever 220 is an offset finger 224, which finger is slidably mounted through a suitable slot 225 formed in the front end wall 38 of the opener.

The mechanism just described is illustrated in its retracted position in Figure 9, while in Figure 4 it is illustrated in its truck lifting position.

During the initial swing of the setting handle 145 the crank pin 218 will travel along the cam slot 219 to move the lifter lever 220 forwardly until the hook like end 226 of the offset finger will ride under the truck lifting pin 227 projecting rearwardly from the rear end of the truck 212. At substantially this point in the operation of the setting means the crank pin 218 will reach the end of cam slot 219 and the remaining movement of the setting means will act through the crank pin 218 engaging the end of cam slot 219 to lift the lever 220 and, because the hook shaped end 226 of the offset finger is now engaging the pin 227, the rear end of the truck will be lifted as illustrated in Figure 4.

When the setting handle 145 is swung to its retracted position, the lifting lever 220 will be returned, thereby lowering the rear truck of the conveyor to its operative position as illustrated in Figure 9.

From the above description, it will be appreciated that the opener may be easily, quickly and conveniently mounted upon, or removed from the power plant.

As previously stated, the power plant is provided with an envelope flap moisting device 24 which may be turned to an operative position wherein the flap of each envelope passing through the machine will be automatically opened, moistened and closed to perform the sealing operation on the envelopes under treatment.

The moistening device may also be turned to an off position whereby envelopes passing through the machine will not be acted upon.

It will be appreciated that when the letter opening device is mounted on the power plant and is operating to open envelopes, that it would be undesirable to have the envelope flap moistening device turned to its "on" position, as in case of such an adjustment the flaps of the previously sealed envelopes would be very liable to catch upon the flap opening blade of the moistening device and to not only cause damage to the envelopes but also possible damage to the moistener as well as to interrupt operation of the machine.

Likewise, when the machine has been adjusted to seal the flaps of envelopes under treatment, it would be extremely undesirable for the opener to function to cut the newly sealed envelopes open.

To avoid the possibility of either of the above contingencies, a safety control means is provided which will automatically act to shift the guide plate 78 of the opener to its inoperative position when the moistening device is turned on, and which means will automatically function to return the guide plate of the opener to its previously adjusted operative position when the moistening device is turned off.

It will be appreciated that a number of different connecting means may be employed for placing either the moistener or opener in their operative positions while substantially simultaneously therewith rendering either of the other of these two devices inoperative.

In the "envelope flap moistening device" disclosed in the stated Finfrock application, the moistening device is provided with an envelope flap opening blade which is mounted upon a swing frame.

The moistening tube of this application is provided with an eccentric portion against which the swing frame is yieldingly urged by a suitable spring means and, due to this arrangement, both the moistening tube and the flap opening blade are moved simultaneously to or from their operative positions.

This same form of envelope flap moistening device is made use of herein.

In Figure 15 the swing frame 228 is shown yieldingly urged into operative engagement with the eccentric portion 229 of the capillary moistening tube 230 by a suitable spring means 231. In this form of the invention the motion of the swing frame 228 is made use of to actuate the guide plate of the opener to or from its operative positions.

The safety control mechanism may include, as illustrated in Figure 15, a connecting rod 232, which connects the end of the swing frame to the crank arm 233 of a bell crank lever 234 journaled in the power plant by means of shaft 235. A link 236 may connect the free end of arm 233a with the crank lever 237 of a vertically extending stub shaft 238.

As clearly illustrated in Figures 14, 15 and 16, the stub shaft may be journally mounted in the frame-work of the power plant. The upper end of the stub shaft is provided with a tongue 238a arranged to enter a cooperating slot 239 formed in the lower end of control shaft 240, which shaft is journaled in a bracket 240a formed upon the front face of the depending flange 40 (Fig. 16). An opening 241 is formed through the bottom plate 41 to connect the coupling of the power plant stub shaft with the control shaft of the opener.

The upper end of the control shaft is provided with an eccentric pin 242 cooperating with an appropriate slot 243 formed in the guide plate flange 244.

The tongue 238a and groove 239 are formed to turn into registration, if out of alignment, as the opening device is lowered into its operative position on the power plant. This act is clearly illustrated in Figure 16.

An example will clearly illustrate the functioning of this control means.

Assume the opener to be operating and set to take a medium width of cut by swinging handle 81a opposite the letter "M" of the dial 85a. It is now desired to seal the day's mail. The operative need only turn on the sealing means, which action will cause the eccentric portion 229 of the capillary tube to rock the swing frame 228. This action will, through the mechanism just previously described, turn the control shaft 240, which will rotate its eccentric pin 242 sufficiently to engage the outer end of slot 243, and through flange 244 move the guide plate 78 to its most outward position, as illustrated in Figure 16, in which position this plate will safely direct all mail matter past the cutting discs and in this simple way prevent the mail matter from being trimmed by the cutters. The mail matter is guided beyond the range of the cutters.

The outward or forward movement of the guide plate 78 will not disturb the setting of handle 81a due to the length of slot 83, note Figure 16. When all of the mail matter has been sealed and it is again desired to remove a medium trim from other envelopes, the sealer may be returned to its "off" position, whereupon the control shaft 240 will be returned to its original setting and as a result thereof its eccentric pin 242 will be retracted from the end of slot 243. The guide plate will now be urged under the influence of spring 78d toward its fully retracted position but will be arrested in this movement when the end of slot 83 engages the eccentric pin 82 of the control shaft 81, thus retaining the plate in its formerly adjusted position.

Figure 11:
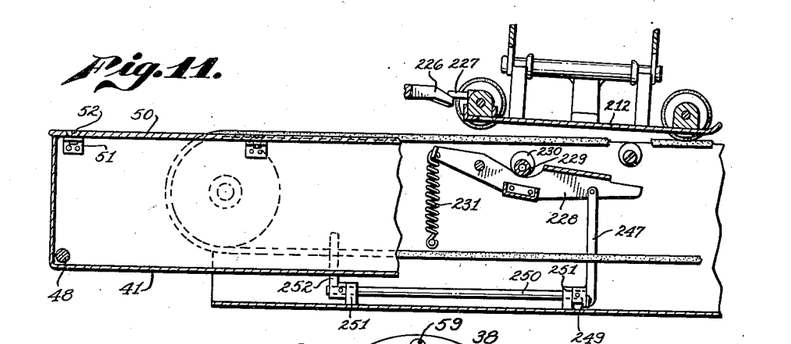
Figure 11 illustrates a fragmental sectional view taken substantially in the plane of line 11—11 of Figure 4. A portion of the casing of the opening device has been broken away to show more clearly the actuating mechanism of the safety control means whose function is to prevent both the moistener and opener from being in operative positions at the same time.

In Figures 4 and 11 there is illustrated a modified form of the safety control means which is operable to prevent the mounting of the letter opening device onto the power plant unless the moistening device will have first been turned to its "off" position.

The safety means is also operable to prevent the flap opening blade of the sealing device from being moved into its operative position while the letter opener is mounted on the power plant.

This means may include the connecting rod 247 which operatively connects the swing frame 228 to the outer end of the crank arm 249.

The crank arm is fastened upon one end of the control shaft 250 whereby a movement of the swing frame will be transmitted through the connecting rod to the control shaft. The control shaft 250 may be journaled on the power plant by means of bearing brackets 251, while the opposite end of the control shaft may carry a lever arm 252.

When the moistening device is turned to its inoperative position, the lever arm 252 will be rotated to its full line position, as illustrated in Figure 4, in which position the free end of this arm will be swung clear of the front end of the letter opening device whereby this device may be mounted upon the machine.

If the moistening device is turned to its active position before the letter opening device is mounted upon the power plant, the lever arm 252 will be swung to its dotted line position as illustrated in Figure 4, in which position it will act to prevent the opener from being mounted upon the power plant.

Should an attempt be made to turn the moistening device to its operative position while the letter opener is mounted on the power plant, the free end of lever arm 252 will strike against the front face of the opener, thus preventing the envelope flap opening blade from being swung into its operative position. In other words, the opener cannot be mounted upon the power plant as long as the moistening device is in its active position and once the opener has been mounted on the power plant the moistening device cannot be rendered active.

*Operation*

The mail treating machine thus far described may be used to either seal envelopes or to cut previously sealed envelopes open.

When the machine is to be used for sealing envelopes, the handle 253 of the moistening device may be actuated to place the moistening device in its operative position, this actuation automatically rendering the opener inactive. Next, the motor may be placed in operation by actuating the motor circuit switch 254 (Figure 1) to drive the envelope feed conveyor and the opener. The machine is now ready to seal the flaps of envelopes which may be placed in the envelope magazine 22, from which the envelopes will be serially withdrawn by means of conveyor 23 and thereby passed over the sealing means which will act to open the flaps, moisten the gummed surface thereof, and to close the flaps into sealing relation with the body portion of the envelope. The envelope flaps are opened, moistened and closed as they are carried along by the conveyor and are finally ejected from the machine in a sealed condition.

After all of the envelopes have been sealed, the letter opening device may be placed in operation by turning handle 253 of the moistening device 24 to place the moistener out of service. The envelopes which are to be opened may be placed in the envelope magazine 22, from which they will be withdrawn one at a time and fed to the opener. The round belt 93 which due to its diagonal relation to the guiding surface of the opener will engage each envelope as it arrives and place it in directing relation to the guiding surface, thus insuring that each envelope will be guided to the cutter discs 61 and 62, which discs are rotating at relatively high speed and will trim from each envelope a strip of uniform width.

While I have illustrated preferred forms of my invention, it is to be understood that the foregoing description is for illustrative purposes only, and I do not desire to be limited by any of the details shown or described except as defined in the appended claims.

I claim:

1. In an envelope opening machine, an envelope opening mechanism, a conveyor operable for serially feeding envelopes to the opening mechanism, means operable for directing the envelopes carried by the conveyor into shearing relation with the opening mechanism, and a control means operable for adjustably setting the said means from a non-cutting guiding position in which position envelopes guided thereby will pass clear of the cutting means to a maximum cutting position in which position a maximum width of trim will be cut from the envelopes under treatment.

2. In a mail treating machine, a powerplant including a magazine, a feed conveyor, a driving mechanism, a conveyor clutch for releasably connecting the conveyor to the driving mechanism, a normally inactive attachment driving clutch, a control means for the conveyor clutch, and a control means for the attachment clutch; a power driven envelope opening device attachable to the powerplant for opening envelopes fed thereto by the conveyor, and means operable upon the placing of the opening device upon the powerplant for simultaneously locking the device to the powerplant and for actuating the conveyor and attachment clutch control means for maintaining both of said clutches in driving engagement with the driving mechanism.

3. In a mail treating machine, a powerplant including a magazine, a feed conveyor operable for serially withdrawing envelopes from the magazine, a driving mechanism, a conveyor clutch releasably connecting the conveyor with the driving mechanism, and a normally inactive attachment clutch; a power driven envelope opening device attachable to the powerplant for opening envelopes fed thereto by the conveyor, and means operable for locking the opening device onto the machine and for placing the conveyor and attachment clutches in driving engagement with the driving mechanism.

4. In a mail treating machine, a powerplant including an envelope magazine, a feed conveyor operable for serially withdrawing envelopes from the magazine, a truck for the conveyor, a driving mechanism, a conveyor clutch means operable for connecting the conveyor to the driving mechanism, a normally inactive attachment clutch; a power driven envelope opening device attachable to the powerplant for opening envelopes fed thereto by the conveyor, and means brought into action by the attachment of the opening device to the powerplant for rendering the conveyor and attachment clutches active and for lifting the conveyor truck free of the conveyor.

5. In a mail treating machine, a powerplant including a feed conveyor operable for serially feeding envelopes, and a truck for the conveyor; an envelope opening device attachable to the machine for opening envelopes fed thereto by the conveyor, and means brought into action by the attachment of the opening device to the powerplant for freeing the truck from the conveyor.

6. In a mail treating machine, a powerplant including a conveyor operable for serially feeding envelopes, a driving mechanism, a conveyor clutch releasably connecting the conveyor with the driving mechanism, a normally inactive attachment clutch, a conveyor clutch control means operatively responsive to the attachment clutch, and means controlling the action of the attachment clutch; an envelope opening device attachable to the powerplant for opening envelopes fed thereto by the conveyor, and means brought into action by the attachment of the opening device to the powerplant for rendering the conveyor clutch control means inoperative to release the conveyor clutch and for actuating the attachment clutch control means for maintaining the attachment clutch in driving engagement with the driving mechanism.

7. In a mail treating machine, a powerplant including a guide wall, an envelope magazine having one side in alignment with the said guide wall, and an envelope feed conveyor arranged parallel to said wall and operable for serially feeding envelopes from the magazine; a letter opening device mounted in the powerplant and having cutting means positioned a predetermined distance outwardly from the envelope engaging face of the guide wall for trimming a strip of predetermined width from the body of each of the envelopes conveyed therepast, said opening device having a guide wall in substantial alignment with the powerplant guide wall, and a conveyor means mounted in the opening device and diagonally related to the powerplant guide wall for moving the envelopes under treatment into guiding relation with said guide walls.

COMMODORE D. RYAN.